(12) United States Patent
Fujita

(10) Patent No.: US 11,331,891 B2
(45) Date of Patent: May 17, 2022

(54) METHOD OF PRODUCING LAMINATED STRUCTURE

(71) Applicant: FUJIMORI KOGYO CO., LTD., Tokyo (JP)

(72) Inventor: Shiro Fujita, Tokyo (JP)

(73) Assignee: FUJIMORI KOGYO CO., LTD., Tokyo (JP)

( * ) Notice: Subject to any disclaimer, the term of this patent is extended or adjusted under 35 U.S.C. 154(b) by 166 days.

(21) Appl. No.: 16/129,802

(22) Filed: Sep. 13, 2018

(65) Prior Publication Data

US 2019/0084283 A1    Mar. 21, 2019

(30) Foreign Application Priority Data

Sep. 19, 2017    (JP) .............................. JP2017-179275

(51) Int. Cl.
| | |
|---|---|
| *B32B 27/30* | (2006.01) |
| *B32B 37/14* | (2006.01) |
| *B32B 27/26* | (2006.01) |
| *B29C 45/14* | (2006.01) |
| *B32B 37/12* | (2006.01) |

(Continued)

(52) U.S. Cl.
CPC ...... *B32B 27/308* (2013.01); *B29C 45/14688* (2013.01); *B29C 45/14811* (2013.01);
(Continued)

(58) Field of Classification Search
CPC ..... B32B 27/308; B32B 37/142; B32B 27/26; B32B 37/1207; B32B 7/12; B32B 27/08;
(Continued)

(56) References Cited

U.S. PATENT DOCUMENTS 5,326,605 A * 7/1994 Ono ........................... C09J 4/06
428/41.2
10,544,333 B2    1/2020 Fujita et al.
(Continued)

FOREIGN PATENT DOCUMENTS

CN        101124087 A      2/2008
JP        03111408 A   *  5/1991    .............. C08F 20/14
(Continued)

OTHER PUBLICATIONS

Office Action for Chinese Patent Application No. 201811080289.7 dated Mar. 27, 2020 and English translation thereof; 12 pgs.
(Continued)

*Primary Examiner* — Jacob T Minskey
*Assistant Examiner* — S. Behrooz Ghorishi
(74) *Attorney, Agent, or Firm* — Hauptman Ham, LLP

(57) ABSTRACT

A method of producing a laminated structure includes: a laminated structure that has high adhesion strength between resin layers and that is excellent in respect of working efficiency, the method including: a lamination step of preparing an intermediate laminate in which a first resin layer and a second resin layer are laminated with an adhesive resin layer interposed between the first resin layer and the second resin layer; a first molding step of molding the intermediate laminate; and a second molding step of forming a resin member on a surface of the molded intermediate laminate by injection molding using a raw material resin to obtain a laminated structure in which at least a part of the adhesive resin layer is thermally cured to be an adhesion layer. An adhesive resin composition constituting the adhesive resin layer contains at least an acrylic-based polymer, a crosslinking agent, and a thermal polymerization initiator.

8 Claims, 9 Drawing Sheets

(51) Int. Cl.
    *B29C 51/00*     (2006.01)
    *B29K 633/20*     (2006.01)
    *B29K 633/04*     (2006.01)
    *B29K 621/00*     (2006.01)
    *B29K 633/00*     (2006.01)

(52) U.S. Cl.
    CPC ............ *B32B 27/26* (2013.01); *B32B 37/142* (2013.01); *B29C 51/00* (2013.01); *B29K 2621/006* (2013.01); *B29K 2633/08* (2013.01); *B29K 2633/12* (2013.01); *B29K 2633/20* (2013.01); *B29K 2633/26* (2013.01); *B32B 37/1207* (2013.01)

(58) Field of Classification Search
    CPC ... B32B 37/06; B32B 37/10; B29C 45/14811; B29C 45/14688; B29C 51/00; B29C 43/02; B29C 45/14; B29K 2633/20; B29K 2633/12; B29K 2633/08; B29K 2621/006; B29K 2633/26
    See application file for complete search history.

(56) References Cited

U.S. PATENT DOCUMENTS

| | | |
|---|---|---|
| 10,604,683 B2 | 3/2020 | Fujita et al. |
| 10,919,276 B2 | 2/2021 | Fujita et al. |
| 2009/0104441 A1* | 4/2009 | Sawada ............. B29C 45/14811 428/337 |
| 2015/0267089 A1 | 9/2015 | Niimi et al. |
| 2018/0044552 A1 | 2/2018 | Fujita et al. |

FOREIGN PATENT DOCUMENTS

| | | | |
|---|---|---|---|
| JP | 2006264321 A | | 10/2006 |
| JP | 2009-73088 A | | 4/2009 |
| JP | 2013234322 A | * | 11/2013 |
| JP | 2016141706 A | | 8/2016 |
| JP | 2016216554 A | | 12/2016 |
| JP | 2017025152 A | | 2/2017 |
| WO | 2014065126 A1 | | 5/2014 |
| WO | 2017/013479 A1 | | 1/2017 |

OTHER PUBLICATIONS

Office Action for Chinese Patent Application No. 201811080289.7 dated Nov. 12, 2020 and English translation thereof; 15 pgs.

Office Action in Chinese Patent Application No. 201811080289.7 dated Apr. 29, 2021 with English summary; 5 pgs.

Notice of Allowance in Japanese Patent Application No. 2017-179275 dated Jun. 15, 2021; 5 pgs.

Office Action in corresponding Chinese Patent Application No. 201811080289.7 dated Nov. 1, 2021; 4 pgs.

* cited by examiner

METHOD OF PRODUCING LAMINATED STRUCTURE

CROSS-REFERENCE TO RELATED APPLICATIONS

This application claims the priority from Japanese Patent Application No. 2017-179275 (filing date: Sep. 19, 2017). The entire teachings of the above application are incorporated herein by reference.

BACKGROUND OF THE INVENTION

(1) Field of the Invention

The present invention relates to a method of producing a laminated structure.

(2) Description of Related Art

A laminated structure, in which a first resin layer and a second resin layer are integrated, is used. The above-mentioned laminated structure can be prepared, for example, by a method of forming the second resin layer to the first resin layer by insert molding (for example, see Japanese Unexamined Patent Application, First Publication No. 2009-073088).

SUMMARY OF THE INVENTION

In the above-mentioned production method, there are cases where the adhesion strength between the first resin layer and the second resin layer is not sufficient. Additionally, improvement in the above-mentioned production method has been demanded in respect of working efficiency.

An object of one aspect of the present invention is to provide a method of producing a laminated structure, which can produce a laminated structure that has high adhesion strength between resin layers and that is excellent in respect of working efficiency.

In order to solve the above-mentioned problems, one aspect of the present invention provides a method of producing a laminated structure, the method comprising: a lamination step of preparing an intermediate laminate in which a first resin layer and a second resin layer are laminated with an adhesive resin layer interposed between the first resin layer and the second resin layer; a first molding step of molding the intermediate laminate; and a second molding step of forming a resin member on a surface of the molded intermediate laminate by injection molding using a raw material resin to obtain a laminated structure in which at least a part of the adhesive resin layer is thermally cured to be an adhesion layer, wherein an adhesive resin composition constituting the adhesive resin layer contains at least (A) an acrylic-based polymer, (B) a crosslinking agent, and (C) a thermal polymerization initiator.

It is preferable that at least an internal surface is decorated in at least either one of the first resin layer and the second resin layer.

It is preferable that the adhesive resin composition further comprises an acrylic-based monomer or an acrylic-based oligomer.

It is preferable that the adhesive resin composition further comprises an acrylic-based monomer, and the acrylic-based monomer is a monomer containing a hydroxyl group.

It is preferable that the adhesive resin composition further comprises an acrylic-based oligomer and contains curable urethane acrylate as the acrylic-based oligomer.

It is preferable that the adhesion layer has a haze of 2.0% or less and has an adhesion strength to the first resin layer or the second resin layer of 20 N/25 mm or more.

It is preferable that the adhesion layer has a haze of 1.0% or less and has a transmittance of visible light of 85% or more.

It is preferable that the adhesion layer has a thickness of 20 μm or more and 200 μm or less.

It is preferable that the adhesive resin layer has an adhesion strength to the first resin layer or the second resin layer of the intermediate laminate of less than 20 N/25 mm, and the adhesion layer has an adhesion strength to the first resin layer or the second resin layer of the laminated structure of 20 N/25 mm or more.

During the preparation of the intermediate laminate in the lamination step, a first separator is peeled from a structure having the first separator, a second separator, and the adhesive resin layer laminated between the first separator and the second separator, an exposed surface of the adhesive resin layer is stuck to one of the first resin layer and the second resin layer, the second separator is then peeled, and an exposed surface of the adhesive resin layer can be stuck to the other of the first resin layer and the second resin layer.

In the lamination step, the adhesive resin layer is stuck to one of the first resin layer and the second resin layer, and then the adhesive resin layer can be pressed via the second separator using a pressing roller before the second separator is peeled.

In the second molding step, it is preferable that a melting temperature of the raw material resin upon formation of the resin member is higher than a 1-minute half-life temperature of the thermal polymerization initiator.

DETAILED DESCRIPTION OF PREFERRED EMBODIMENTS

Figure 1:
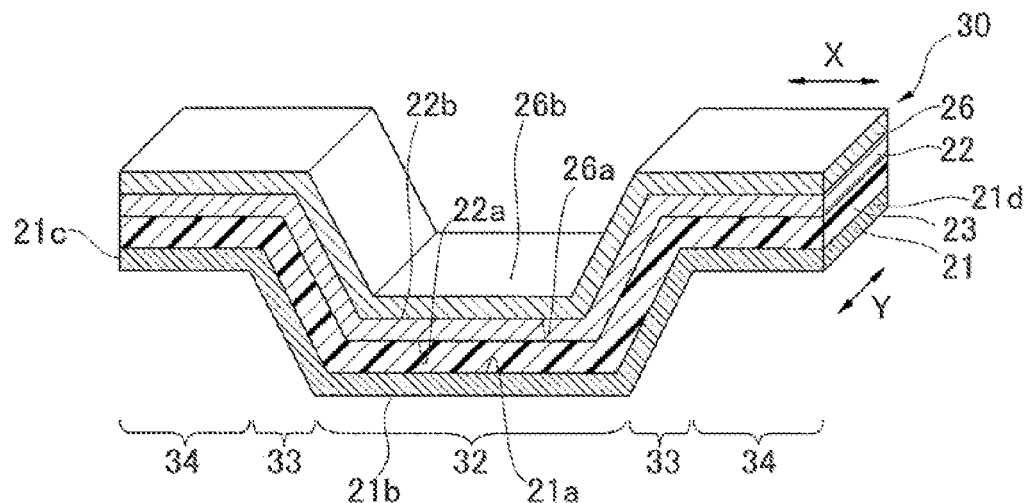
FIG. 1 is a schematic view showing one example of a laminated structure prepared by a production method of a first embodiment.

Referring to the drawings, the present invention will be described below based on preferred embodiments.

Laminated Structure First Embodiment

Figure 2:
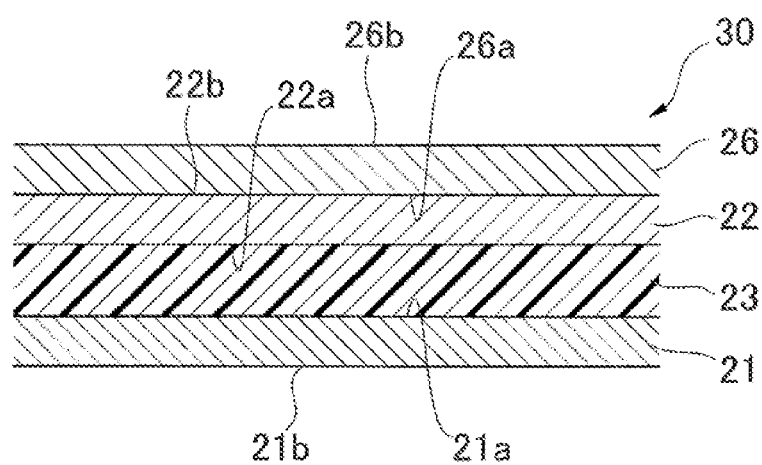
FIG. 2 is an enlarged view showing a part of the laminated structure of FIG. 1.

FIG. 1 is a schematic view showing a laminated structure 30 that is one example of a laminated structure prepared by a production method of a first embodiment. FIG. 2 is an enlarged view showing a part of the laminated structure 30.

As shown in FIGS. 1 and 2, the laminated structure 30 comprises a bottom part 32, inclined parts 33 extending from both ends of the bottom part 32, and flange parts 34 extending outward from outer ends of the inclined parts 33. The inclined parts 33 are inclined so that they each rise outward from both ends of the bottom part 32.

The laminated structure 30 is configured such that a first resin layer 21 and a second resin layer 22 are laminated with an adhesion layer 23 interposed therebetween, and a third resin layer 26 (resin member) is laminated on the second resin layer 22. That is, the laminated structure 30 comprises the first resin layer 21, the second resin layer 22, the adhesion layer 23, and the third resin layer 26.

The resin layers 21 and 22 are adherends which are stuck with the adhesion layer 23.

As a raw material resin for the resin layers 21, 22, and 26, thermoplastic resins such as polyolefins (polyethylene, polypropylene, and the like), polyester, polycarbonate, polyamide, acryl, polyvinyl chloride, cellulose ester, an acrylonitrile-styrene copolymer (AS resin), and an acrylonitrile-butadiene-styrene copolymer (ABS resin) are preferable. The resin layers 21, 22, and 26 may include thin films, patterns, particles, fine wire, fine structures or the like of different materials (metal, inorganic material, organic material, and the like) on the surfaces or interiors of the resin layers 21, 22, and 26. A material, thickness, shape, and the like of the resin layers 21, 22, and 26 may be the same or different, respectively.

The resin layers 21 and 22 are brought into contact with the adhesion layer 23 at internal surfaces 21a and 22a, respectively.

External surfaces 21b and 22b of the resin layers 21 and 22 are surfaces opposite to the internal surfaces 21a and 22a, respectively.

The surface of the third resin layer 26 on the second resin layer 22 side is referred to as an internal surface 26a, and the surface opposite to the internal surface 26a is referred to as an external surface 26b. The internal surface 26a of the third resin layer 26 is in contact with the external surface 22b of the second resin layer 22.

Each of the external surfaces of the bottom part 32, the inclined parts 33, and the flange parts 34 may be flat, or at least a part thereof may have a curved surface.

It is preferable that the internal surface 21a of the first resin layer 21 is decorated. For example, the internal surface 21a can be decorated with shape, pattern, color or a combination thereof. The decoration with shape can be performed, for example, by formation of irregularities modeling symbols (letter and the like), figures or the like. The decoration with pattern is performed, for example, by formation of pattern such as a diagram modeling symbols (letter and the like), figures or the like. The decoration with color is performed, for example, by coloring conforming to symbols (letter and the like), figures or the like. The decoration may display a product name, a manufacture or the like.

The decoration of the internal surface 21a may be performed by forming a film. The film can be formed by applying a paint including a resin composition containing a coloring agent (for example, pigment and dye) onto the internal surface 21a by screen printing, intaglio printing or the like, followed by drying. The film formation is suitable for decoration with pattern or color.

The pigment includes an organic pigment and an inorganic pigment. Examples of the organic pigment include azo pigments, phthalocyanine pigments, and the like. Examples of the inorganic pigment include oxides such as titanium oxide and red iron oxide; carbon such as carbon black; chromic acid salts such as chrome yellow and molybdate orange; ferrocyanides such as Prussian blue; and the like. The dye includes a solvent dye, an acid dye, a fluorescent dye, and the like.

The color of the coloring agent may be black, white or chromatic color (red, yellow, green, blue, purple or the like). The coloring agent may be used alone, or if necessary, a plurality of kinds thereof may be used concurrently.

The above-mentioned film may have a light-shielding property, or may have light permeability.

The decoration of the internal surface 21a with pattern or color is not limited to the film formation, but may be performed by inclusion of the coloring agent in a material of the first resin layer 21.

The above-mentioned decoration is not limited to the internal surface 21a of the first resin layer 21, but may be applied on the external surface 21b. That is, the decoration may be applied on one or both of the internal surface 21a and the external surface 21b. The above-mentioned decoration may be applied on one or both of the internal surface 22a and the external surface 22b of the second resin layer 22.

It is preferable that at least the internal surface of at least either one of the first resin layer 21 and the second resin layer 22 is decorated.

It is particularly preferable that the above-mentioned decoration is applied on the first resin layer 21. For example, a configuration in which the adhesion layer 23, the second resin layer 22, and the third resin layer 26 are transparent, and the internal surface 21a of the first resin layer 21 is decorated (first configuration) can be made. Additionally, a configuration in which the first resin layer 21 and the adhesion layer 23 are transparent, and the internal surface 22a of the second resin layer 22 is decorated (second configuration) can be also made. In the first or second configuration, the decoration can be visually recognized from both sides of the laminated structure, or from one surface (surface on a transparent layer side) of the laminated structure.

In the second resin layer 22 and the third resin layer 26, the transmittance of visible light (wavelength 380 to 750 nm) may be, for example, 85% or more in the entire wavelength range of visible light. The visible light transmittance can be measured, for example, with a spectrophotometer (JASCO Corporation, Spectrophotometer V-670).

The second resin layer 22 and the third resin layer 26 suitably have a haze of 2.0% or less (preferably 1.0% or less).

The first resin layer 21 may have a light-shielding property, and the visible light transmittance and the haze may fall within the above-mentioned ranges.

It is preferable that the transmittance of visible light (wavelength 380 to 750 nm) of the adhesion layer 23 is, for example, 85% or more in the entire wavelength range of visible light. When the transmittance of visible light is 85% or more in the entire wavelength range of visible light, the optical properties of the laminated structure 30 can be improved.

The lower limit of the thickness of the adhesion layer 23 is preferably 20 μm or more, more preferably 30 μm or more, and further preferably 40 μm or more. The upper limit of the thickness of the adhesion layer 23 is preferably 200 μm or less, more preferably 150 μm or less, and further preferably 120 μm or less. When the thickness of the adhesion layer 23 is 20 μm or more, the first resin layer 21 and the second resin layer 22 can adhere firmly. When the thickness of the adhesion layer 23 is 200 μm or less, the adhesion layer 23 can be uniformly formed, and the mechanical properties of the laminated structure 30 can be improved. It is preferable that the adhesion layer 23 has a constant thickness.

The adhesion layer 23 has an adhesion strength to the first resin layer 21 or the second resin layer 22 of preferably 20 N/25 mm or more. When the adhesion strength is 20 N/25 mm or more and preferably 30 N/25 mm or more, the mechanical properties of the laminated structure 30 can be improved.

The adhesion layer 23 suitably has a haze of 2.0% or less (preferably, 1.0% or less). When the haze of the adhesion layer 23 is 2.0% or less, the optical properties of the laminated structure 30 can be improved. The haze can be measured using, for example, a haze meter (NDH7000SP manufactured by NIPPON DENSHOKU INDUSTRIES Co., LTD.) in accordance with JIS K7136.

Figure 3:
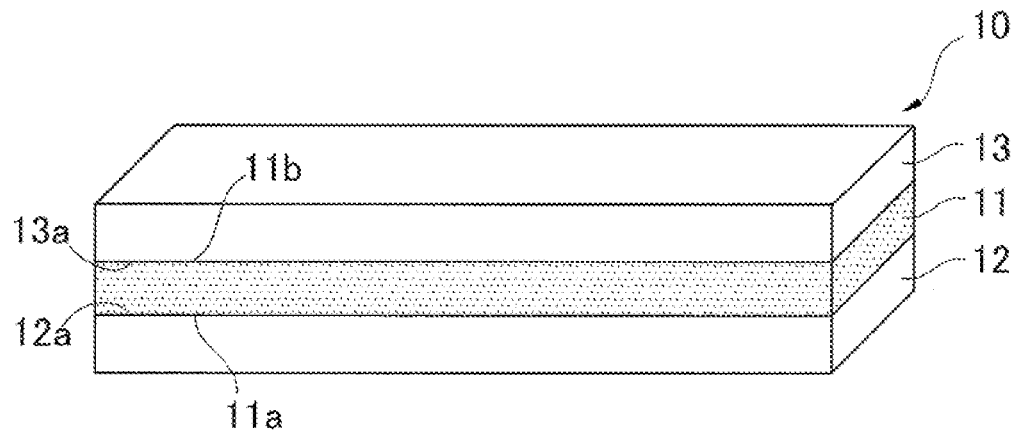
FIG. 3 is a schematic view showing an adhesive resin film usable in a production method of an embodiment.

FIG. 3 is a schematic view showing an adhesive resin film 10 usable in the production method of an embodiment. The adhesive resin film 10 is a structure having a first separator 12, a second separator 13, and an adhesive resin layer 11 laminated between them.

The adhesive resin layer 11 becomes the adhesion layer 23 shown in FIG. 1 by thermal curing as described later.

Each of the separators 12 and 13 may be a film including a resin such as polyester (polyethylene terephthalate (PET) or the like) and polyolefin (polyethylene, polypropylene or the like). The separators 12 and 13 have peelability on surfaces 12a and 13a that come in contact with the adhesive resin layer 11. That is, the surfaces 12a and 13a are peeling surfaces. Examples of a configuration of the separators 12 and 13 include a configuration in which a peeling agent layer is provided on one surface or both surfaces of a resin film, and a configuration in which a peeling agent is contained in a resin film.

As the separators 12 and 13, paper, synthetic paper, metal foils, various sheets, and the like can also be used in place of the resin film. When the separators 12 and 13 have transparency, since an optical inspection of the adhesive resin layer 11 can be conducted while maintaining the adhesive resin film 10 in which the separators 12 and 13 are not peeled, this is preferable.

An adhesive resin composition constituting the adhesive resin layer 11 contains at least (A) an acrylic-based polymer, (B) a crosslinking agent, and (C) a thermal polymerization initiator. The surfaces (first face 11a and second face 11b) of the adhesive resin layer 11 have pressure-sensitive adhesiveness at an ambient temperature. That is, the first face 11a and the second face 11b are pressure-sensitive adhesive surfaces.

The adhesive resin layer 11 is composed of an adhesive resin composition in the entire thickness direction. If the adhesive resin layer 11 is composed of the adhesive resin composition satisfying the requirement, the adhesive resin layer 11 may include two or more layers composed of the same or different adhesive resin composition(s). When the adhesive resin layer 11 includes a monolayered adhesive resin layer, since the cost can be reduced by simplifying the layer configuration, this is preferable. The adhesive resin composition contains an acrylic-based adhesive resin (polymer). When the adhesive resin composition contains an acrylic-based polymer, the adhesive resin layer 11 can be formed into the adhesion layer 23 having high transparency, and the effect that the visibility of the laminated structure 30 can be improved is obtained.

Examples of a monomer constituting the (A) acrylic-based polymer include an acrylic-based monomer having an ester group (—COO—), an acrylic-based monomer having a carboxyl group (—COOH), an acrylic-based monomer having an amide group (—CONR$_2$ wherein R is a hydrogen atom or a substituent such as an alkyl group), an acrylic-based monomer having a nitrile group (—CN), and a non-acrylic-based monomer such as olefins, styrene, vinyl esters, vinyl ethers, and vinylsilane. As the (A) acrylic-based polymer, a copolymer composed of two or more monomers is preferable. A number average molecular weight of the (A) acrylic-based polymer before photopolymerization is preferably, for example, about 50,000 to 1,000,000. Examples of the viscosity include about 1,000 to 10,000 mPa·s.

Examples of the acrylic-based monomer having an ester group (—COO—) include alkyl (meth)acrylate, (meth)acrylate having a hydroxy group (hydroxyl group), (meth)acrylate having an alkoxy group or a polyether group, (meth)acrylate having an amino group or a substituted amino group, and the like. In addition, in the present specification, (meth)acrylate is a generic name of acrylate and methacrylate.

Examples of the acrylic-based monomer having a carboxy group (—COOH) include acrylic acid, methacrylic acid, (meth)acrylate having a carboxyl group (—COOH), and the like.

Examples of the acrylic-based monomer having an amide group (—CONR$_2$ wherein R is a hydrogen atom or a substituent such as an alkyl group) include acrylamide, methacrylamide, and the like.

Examples of the acrylic-based monomer having a nitrile group (—CN) include acrylonitrile, methacrylonitrile, and the like.

In the (A) acrylic-based polymer, it is preferable that 50% by weight or more of a constituent monomer is composed of an acrylic-based monomer. Particularly, it is preferable that 50% by weight or more of the constituent monomer is composed of one or two or more of alkyl (meth)acrylates represented by the general formula $CH_2=CR^1-COOR^2$ (wherein $R^1$ represents hydrogen or a methyl group, and $R^2$ represents an alkyl group having 1 to 14 carbon atoms). Specific examples of the alkyl (meth)acrylate include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-pentyl (meth)acrylate, isopentyl (meth)acrylate, n-hexyl (meth)

acrylate, 2-ethylhexyl (meth)acrylate, n-octyl (meth)acrylate, isooctyl (meth)acrylate, isononyl (meth)acrylate, decyl (meth)acrylate, and dodecyl (meth)acrylate. Particularly, it is preferable to essentially use alkyl (meth)acrylate in which the carbon number of an alkyl group $R^2$ is 4 to 12 (for example, 50 to 100 mol %).

Additionally, examples of the (meth)acrylate containing a hydroxyl group include one or two or more of 2-hydroxyethyl (meth)acrylate, 2-hydroxypropyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, polyethylene glycol mono(meth)acrylate, polypropylene glycol mono(meth)acrylate, cyclohexanedimethanol mono(meth)acrylate, and the like.

As the (B) crosslinking agent (curing agent), for example, an isocyanate-based crosslinking agent, an epoxy-based crosslinking agent, a metal chelate compound or the like can be used. Particularly, when the isocyanate-based crosslinking agent or the epoxy-based crosslinking agent is used, the adhesive resin layer 11 having a high adhesive force is obtained. The (B) crosslinking agent is used for crosslinking the (A) acrylic-based polymer. As necessary, as at least part of the (A) acrylic-based polymer, a polymer or a monomer having a functional group reacting with the (B) crosslinking agent is used. For example, in the case of the isocyanate-based crosslinking agent, the functional group reacting with the (B) crosslinking agent is a hydroxyl group, a carboxyl group or the like. The addition amount of the (B) crosslinking agent is preferably, for example, 1.5 equivalents or less based on the functional group of the polymer.

The curing of the (A) acrylic-based polymer with the (B) crosslinking agent (curing agent) may proceed with aging, at a stage of producing an adhesive resin layer before being stuck to an adherend.

The addition amount of the (B) crosslinking agent is preferably 0.05 to 1 part by weight, and more preferably 0.1 to 0.5 parts by weight based on 100 parts by weight of the (A) acrylic-based polymer.

The (B) crosslinking agent can also crosslink the polymer generated by polymerization of (D) an acrylic-based monomer or an acrylic-based oligomer (described later). In that case, as necessary, a polymer or a monomer having a functional group reacting with the (B) crosslinking agent is used as at least part of the (D) acrylic-based monomer or acrylic-based oligomer. The functional group reacting with the (B) crosslinking agent is a hydroxyl group, a carboxy group or the like, for example, in the case of the isocyanate-based crosslinking agent. The addition amount of the (B) crosslinking agent is preferably, for example, 1.5 equivalents or less based on the functional group of the polymer.

An example of the (C) thermal polymerization initiator includes a radical initiator that is decomposed by heat to initiate polymerization (radical polymerization) of a monomer and to cure a resin.

When the adhesive resin composition contains the thermal polymerization initiator, there is an advantage that the heat energy applied in each process in the production process of the laminated structure 30 can be utilized to enhance the strength of a laminate (for example, an intermediate laminate 24 (see FIG. 8) described later) or the adhesive resin layer 11. Unlike an ultraviolet polymerization initiator, the thermal polymerization initiator has an advantage that even when a laminate is produced using a material that does not allow ultraviolet rays to pass through, the adhesive resin composition can be cured to produce a laminate having high strength.

As the radical initiator, a redox initiator, an organometallic compound or the like which acts at a low temperature is also known, but in respect of handleability of the adhesive resin layer, an (organic) peroxide-based initiator, azo-based radical initiator or the like which acts at a higher temperature is preferable. In order that the thermal polymerization initiator does not react or does not reduce by half in the production process of the adhesive resin layer (particularly, in the step of drying the solvent), it is preferable that the temperature at which the half-life of the thermal polymerization initiator becomes 1 minute (hereinafter, may be referred to as "1-minute half-life temperature") is higher than the boiling point of an organic solvent contained in the adhesive raw material composition.

The 1-minute half-life temperature can be measured by a known method. For example, a thermal polymerization initiator is dissolved in an organic solvent (benzene or the like) to obtain a solution, the resulting solution (for example, the concentration of the thermal polymerization initiator is 0.1 mol/L) is sealed into a glass tube, and this solution is kept at a predetermined temperature to thermally decompose the thermal polymerization initiator. When the decomposition PO amount is expressed by x, the decomposition rate constant by k, the time by t, the PO initial concentration by a, and the half-life by $t_{1/2}$, the following equations (1) to (3) hold.

$$dx/dt=k(a-x) \qquad (1)$$

$$ln\ a/(a-x)=kt \qquad (2)$$

$$kt_{1/2}=ln2 \qquad (3)$$

For that reason, when the thermal polymerization initiator is thermally decomposed at a constant temperature, the relationship between time t and ln a/(a−x) is plotted, and k is obtained from the slope of the resulting straight line, a half-life $t_{1/2}$ at that temperature can be calculated by the equation (3).

In order to sufficiently give a reaction at a temperature during thermal curing for a constant time, the thermal polymerization initiator is preferably a material having a 1-minute half-life temperature lower than a thermal curing set temperature (melting point of the raw material resin of the third resin layer) (preferably, lower than the thermal curing set temperature by 20° C. or higher and more preferably by 50° C. or higher).

Specific examples of the (organic) peroxide-based thermal polymerization initiator include diacyl peroxides such as benzoyl peroxide, acetyl peroxide, decanoyl peroxide, and lauroyl peroxide; dialkyl peroxides such as dicumyl peroxide and di-t-butyl peroxide; alkyl peroxyesters such as t-butyl peroxybenzoate and t-butyl peroxy-2-ethylhexanoate; hydroperoxides such as cumene hydroperoxide and t-butyl hydroperoxide; and the like. Inter alia, an organic peroxide having the above-mentioned 1-minute half-life temperature of 100° C. or higher is preferable, and an organic peroxide having the 1-minute half-life temperature of 200° C. or lower is more preferable. Examples of such an organic peroxide include t-hexyl peroxyneodecanoate, t-butyl peroxyneodecanoate, t-butyl peroxyneoheptanoate, t-hexyl peroxypivalate, t-butyl peroxypivalate, dilauroyl peroxide, 1,1,3,3-tetramethylbutyl peroxy-2-ethylhexanoate, disuccinic acid peroxide, t-hexyl peroxy-2-ethylhexanoate, t-butyl peroxy-2-ethylhexanoate, 1,1-bis(t-hexylperoxy)cyclohexane, 1,1-bis(t-butylperoxy)cyclohexane, t-hexylperoxyisopropyl monocarbonate, t-butylperoxymaleic acid, t-butyl peroxy 3,5,5-trimethyl hexanoate, t-butylperoxyisopropyl monocarbonate, t-butylperoxy-2-ethylhexyl monocarbonate, t-butyl peroxylaurate, t-hexyl peroxybenzoate, t-butyl peroxyacetate, t-butyl peroxybenzoate, n-butyl 4, 4-bis(t-butylperoxy)valerate, dicumyl peroxide, di-t-hexyl peroxide, di-t-butyl peroxide, p-menthane hydroperoxide, and the like.

Examples of the azo-based thermal polymerization initiator include 2,2'-azobis (isobutyronitrile), 2, 2'-azobis (2-methylbutyronitrile), 2,2'-azobis(2,4-dimethylvaleronitrile), 2,2'-azobis(4-cyanovaleronitrile), 2,2'-azobis(4-methoxy-2,4-dimethylvaleronitrile), 2,2'-azobis(methylisobutyrate), 1,1'-azobis(1-cyclohexanecarbonitrile), and the like. Additionally, in order to control the reactivity, a thermal polymerization initiator enclosed in a molecular capsule having a cage-like molecule can be used as the polymerization initiator of the present invention. It is preferable that the cage-like molecule is of an anthracene structure.

It is preferable that the addition amount of the (C) thermal polymerization initiator is 0.001 to 0.5 parts by weight based on 100 parts by weight of the (A) acrylic-based polymer.

The adhesive resin composition can further contain arbitrary components other than (A) to (C).

For example, the adhesive resin composition can contain (D) an acrylic-based monomer or an acrylic-based oligomer.

Of the (D) acrylic-based monomers or acrylic-based oligomers, examples of the acrylic-based monomer include one or two or more of monomers similar to the monomers constituting the (A) acrylic-based polymer, for example, alkyl (meth)acrylate, (meth)acrylate having a hydroxyl group, acrylamide, and the like. The number of polymerizable functional groups such as a (meth)acryloyl group in one molecule may be 1 or 2 or more.

Particularly, when a monomer of (meth)acrylate having a hydroxyl group is contained as at least part of the (D) acrylic-based monomer or the acrylic-based oligomer, the hydroxyl group having polarity becomes easy to disperse in the whole adhesive resin layer. Thereby, since the moisture is hardly condensed, and cloudiness of the adhesive resin layer is suppressed even under the environment having high humidity (furthermore, high temperature), this is preferable. In the (meth)acrylate having a hydroxyl group, the number of hydroxyl groups in one molecule may be 1 or 2 or more.

As at least part of the (D) acrylic-based monomer or acrylic-based oligomer, curable urethane acrylate can be used. Urethane acrylate is a compound having a urethane bond (—NH—COO—) and a (meth)acryloyloxy group ($CH_2$=CX—COO— wherein X=H or $CH_3$) in the same molecule. The curable urethane acrylate is a compound having curability among urethane acrylates due to a (meth)acryloyloxy group that is a polymerizable functional group. The number of urethane bonds in one molecule may be 1 or 2 or more. Additionally, the number of (meth)acryloyloxy groups in one molecule may be 1 or 2 or more.

Examples of the urethane acrylate include a compound obtained by reacting a (meth)acrylate compound having a hydroxyl group with an isocyanate compound, a compound obtained by reacting a urethane prepolymer obtained by reacting a polyol compound with a polyisocyanate compound, with a (meth)acrylate compound having a hydroxyl group, and the like. Examples of the polyol compound include polyester polyol, polyether polyol, and the like.

It is preferable that the (D) acrylic-based monomer or acrylic-based oligomer is a liquid (fluid) that becomes part of a polymer by thermal curing with the (C) thermal polymerization initiator and that has a lower viscosity than the polymer. It is also possible to use the acrylic-based monomer and the acrylic-based oligomer concurrently. Examples of the acrylic-based oligomer include acrylate oligomers such as a urethane acrylate oligomer. The number of polymerizable functional groups possessed by the (D) acrylic-based monomer or acrylic-based oligomer is, for example, 1 to 10, or 2 to 5.

The addition amount of the (D) acrylic-based monomer or acrylic-based oligomer is preferably 5 to 50 parts by weight based on 100 parts by weight of the (A) acrylic-based polymer. When the addition amount of the (D) acrylic-based monomer or acrylic-based oligomer is too large, the adhesive force of the adhesive resin layer may be reduced too much in the case of thermal polymerization.

When the (D) acrylic-based monomer or acrylic-based oligomer is used, the adhesive resin layer 11 has high flexibility, so that air bubbles are less likely to remain between the resin layers 21 and 22.

A polymerization retarder can be added to the adhesive resin composition. By use of the polymerization retarder, it becomes easy to control a polymerization degree. Additionally, use of the polymerization retarder is preferable from the viewpoint that the followability to deformation of the first resin layer and the second resin layer is improved.

Examples of other arbitrary components include an antioxidant, a filler, a plasticizer, and the like. The adhesive raw material composition used in producing the adhesive resin layer may contain water or a solvent such as an organic solvent, or may be a solvent-free syrup-like composition. When a material which is potentially corroded, such as an oxide conductive film such as ITO or a base metal exists on a resin layer, and the adhesive resin layer contacts the material, it is preferable to reduce a corrosive component such as an acid, and, for example, to use a polymer having a low acid value, as a material of the adhesive resin composition.

Since it is possible to apply the adhesive raw material composition with better thickness precision when the composition is dissolved in an organic solvent, the adhesive raw material composition preferably contains the organic solvent. By drying the solvent from the adhesive raw material composition, an adhesive resin layer is obtained. That is, the constitution of the adhesive raw material composition may be such that the solvent is added to the constitution of the adhesive resin composition constituting the adhesive resin layer. The adhesive resin layer functions as a pressure-sensitive adhesive layer at an ambient temperature (before thermal curing).

In producing the adhesive resin layer, it is preferable to cure the acrylic-based monomer or acrylic-based oligomer which is a curing component as much as possible.

When the acrylic-based oligomer is used, both the acrylic-based polymer and the acrylic-based oligomer have a large molecular weight, and the compatibility as a paint becomes bad frequently. For that reason, it is desirable to add a compatibilizing agent. The compatibilizing agent may be a compatibilizing agent having no reactivity, but the compatibilizing agent having no reactivity may possibly be separated in the pressure-sensitive adhesive layer, so that a usable material may possibly be highly limited. Moreover, a problem such as foaming in a durability test may possibly be caused depending on the kind and the addition amount, and the versatility is low. For that reason, a compatibilizing agent that is cured together with the acrylic-based oligomer at the time of thermal reaction is preferable. Since this compatibilizing agent is polymerized, it also leads to suppression of foaming or the like. Hence, it is preferable to select a material having a reactive group.

When an acrylic-based monomer that becomes hard after thermal reaction is used as the compatibilizing agent, the stability of the paint can be expected, and at the same time, the effect that the pressure-sensitive adhesive layer becomes hard after curing can also be expected. Since the acrylic-based monomer has good compatibility and, additionally, has low viscosity as compared with the acrylic-based polymer or the acrylic-based oligomer, it is possible to adjust the viscosity to the optimal viscosity at the time of film formation by adding the acrylic-based monomer when the viscosity of the paint is too high, and the acrylic-based monomer also contributes to improvement in productivity.

In the adhesive resin layer 11, it is preferable that heat generation begins to be confirmed at 80° C. or higher and at least one peak is confirmed between 120° C. and 210° C. in differential scanning calorimetry (DSC) at a temperature raising rate of 10° C./min. When the heat generation is confirmed at lower than 80° C., for example, the thermal curing reaction may proceed at an ambient temperature, and preservability is lowered. By confirmation of the peak between 120° C. and 210° C., thermal curing can proceed at a similar temperature to this.

In order to improve handleability of the adhesive resin layer 11, it is preferable that the adhesive resin layer 11 is thermally cured by heating at a temperature of 100 to 250° C. for a time of 30 seconds to 10 minutes. It is preferable that the adhesive resin layer 11 is thermally cured under a condition of at least part of these temperature and time ranges, and it is more preferable that the adhesive resin layer 11 is thermally curable in the whole ranges. The thermal curing condition at practical use may be outside the above-mentioned ranges. However, from the viewpoint of preservability, it is preferable that thermal curing does not substantially proceed at an ambient temperature, and it is preferable that the adhesive resin layer 11 has a nature that it is not thermally cured by heating, for example, within 10 minutes at a temperature of lower than 100° C.

In the state where the adhesive resin layer 11 is uncured (before heating), it is preferable that a storage elastic modulus at a temperature of 23° C. is $1 \times 10^4$ to $1 \times 10^6$ Pa. Additionally, after the adhesive resin layer 11 has been thermally cured by heating, it is preferable that a storage elastic modulus at a temperature of 23° C. is $1 \times 10^4$ to $1 \times 10^9$ Pa. It is preferable that a storage elastic modulus at a temperature of 23° C. after thermal curing by heating is higher than a storage elastic modulus at a temperature of 23° C. before heating. These storage elastic moduli can be measured by making the adhesive resin layer in the uncured state (before heating), and the adhesive resin layer after thermal curing by heating (adhesive layer after thermal curing) have a temperature of 23° C. The vibration frequency when a storage elastic modulus is measured is, for example, 1 Hz. When a storage elastic modulus of the adhesive layer after thermal curing is measured, the adhesive layer after thermal curing can be obtained as a single body by heating and curing the adhesive resin layer between separators without sticking the adhesive resin layer to the resin layer, and thereafter, peeling the separator.

Method of Producing Laminated Structure First Embodiment

The method of producing the laminated structure 30 will be described below.
(Preliminary Step: Preparation of Adhesive Resin Film)
An adhesive resin film 10 shown in FIG. 3 can be prepared by the following method.

As shown in FIG. 3, an adhesive raw material composition containing a solvent is applied to a separator 12, the solvent is dried, a separator 13 is put thereon to protect the composition, so that the adhesive resin film 10 is obtained. It is preferable that the adhesive raw material composition is applied using a die or a pipe doctor. In drying the solvent, drying with a dryer is preferable. Regarding a time for drying the solvent, in view of productivity, 10 minutes or shorter is preferable, and 2 to 5 minutes is further preferable. Additionally, since it is necessary to sufficiently dry the solvent, it is preferable to perform drying at a temperature of not lower than the boiling point of the solvent, and it is preferable to perform drying at not higher than a 1-minute half-life temperature of the thermal polymerization initiator.
Lamination Step: Preparation of Intermediate Laminate In this step, as shown in FIGS. 4 to 8, an intermediate laminate 24 is prepared. The lamination step will be described in detail below.

Figure 4:
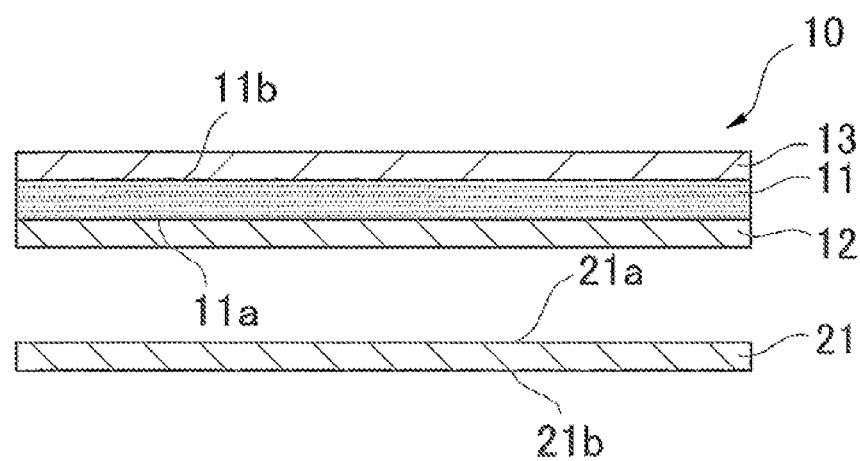
FIG. 4 is a process diagram showing the production method of the first embodiment.
Figure 5:
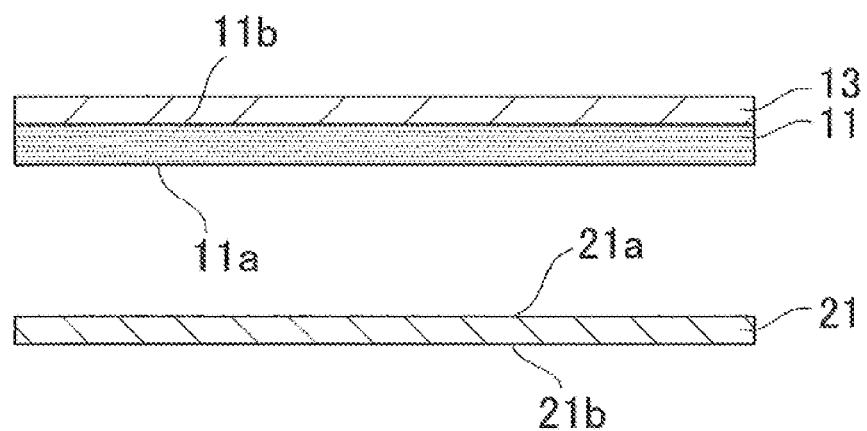
FIG. 5 is a process diagram continuing from the previous diagram.
Figure 6:
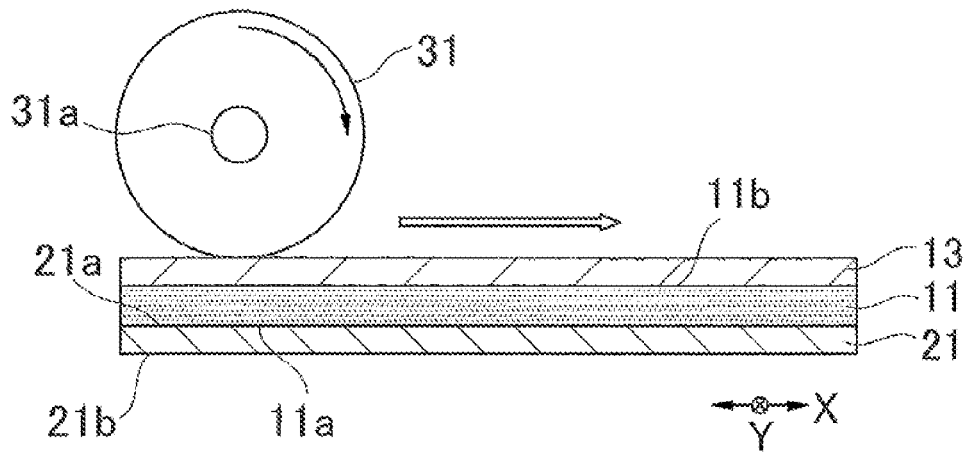
FIG. 6 is a process diagram continuing from the previous diagram.

As shown in FIGS. 4 and 5, the first separator 12 is peeled from the adhesive resin film 10 to expose the pressure-sensitive adhesive surface 11a of the adhesive resin layer 11. As shown in FIG. 6, by abutting the pressure-sensitive adhesive surface 11a against the internal surface 21a of the first resin layer 21, the adhesive resin layer 11 is stuck to the internal surface 21a of the first resin layer 21.

At this time, the adhesive resin layer 11 can be pressed using a pressing roller 31 via the second separator 13. The length of the pressing roller 31 (dimension in the axial direction) is enough as long as it can cover the entire width (Y directional dimension) of the adhesive resin layer 11 via the second separator 13. The pressing roller 31 has a cylindrical shape, and a rotation axis 31a thereof is along the Y direction (direction vertical to the paper plane).

A material of the outer peripheral surface (pressing surface) of the pressing roller 31 is, for example, rubber, resin, metal or the like. Specific examples of the material of the pressing roller 31 include rubber such as silicone rubber, urethane rubber, nitrile butadiene rubber (NBR), fluorine rubber, and chloroprene rubber; resins such as polyolefin (polyethylene, polypropylene, and the like); metal such as stainless steel; and the like.

By rolling the pressing roller 31 in the lengthwise direction (X direction; arrow direction) along the external surface of the second separator 13, the adhesive resin layer 11 can be pressed toward the internal surface 21a of the first resin layer 21 via the second separator 13.

Figure 7:
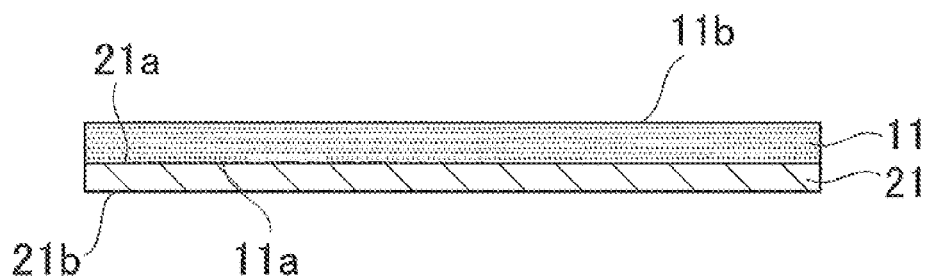
FIG. 7 is a process diagram continuing from the previous diagram.

As shown in FIG. 7, the second separator 13 is peeled from the adhesive resin layer 11.

Figure 8:
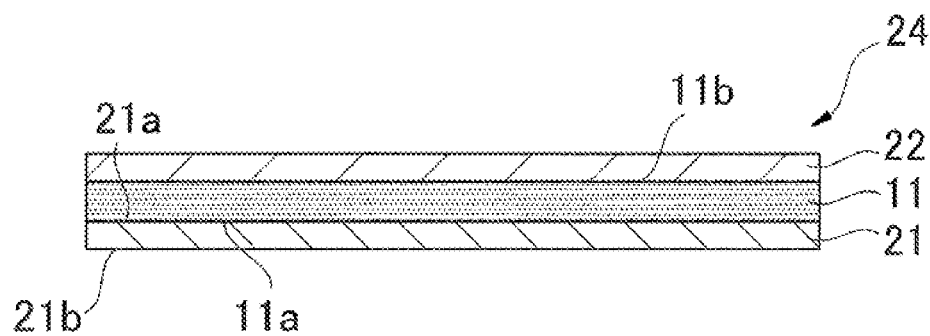
FIG. 8 is a process diagram continuing from the previous diagram.

As shown in FIG. 8, the second resin layer 22 is stuck to the second face 11b of the adhesive resin layer 11. This provides a laminate in which the first resin layer 21 and the second resin layer 22 are laminated via the adhesive resin layer 11. This laminate is referred to as the intermediate laminate 24.

The adhesive resin layer 11 has an adhesion strength to the first resin layer 21 or the second resin layer 22 of, for example, less than 20 N/25 mm.
(First Molding Step: Molding of Intermediate Laminate)

Figure 9:
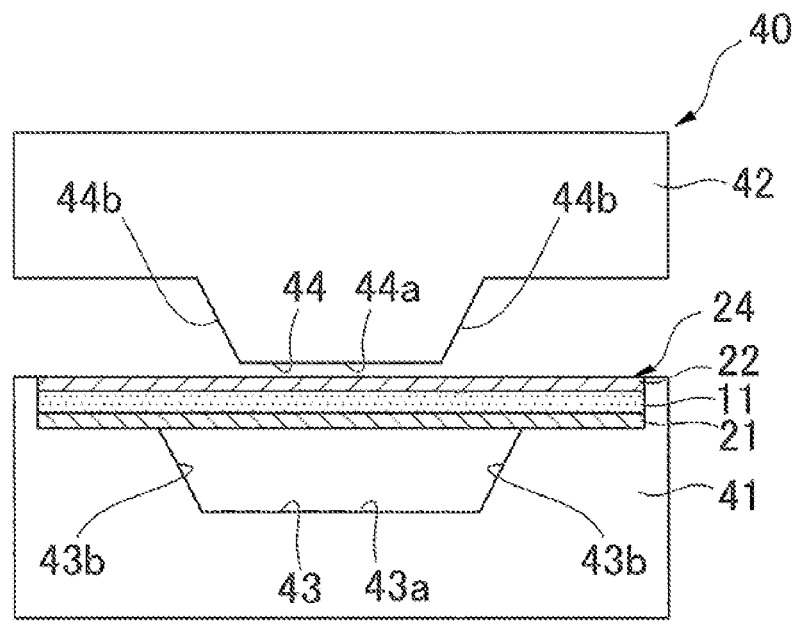
FIG. 9 is a process diagram continuing from the previous diagram.
Figure 10:
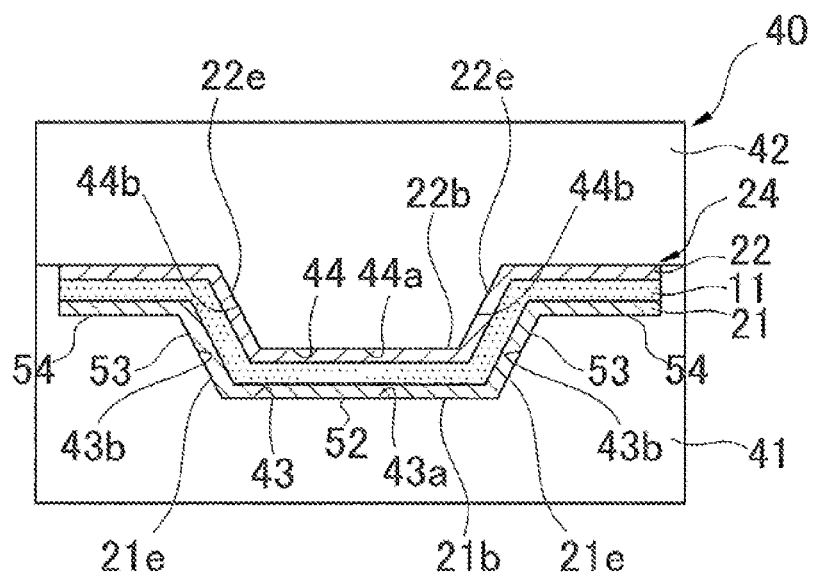
FIG. 10 is a process diagram continuing from the previous diagram.
Figure 11:
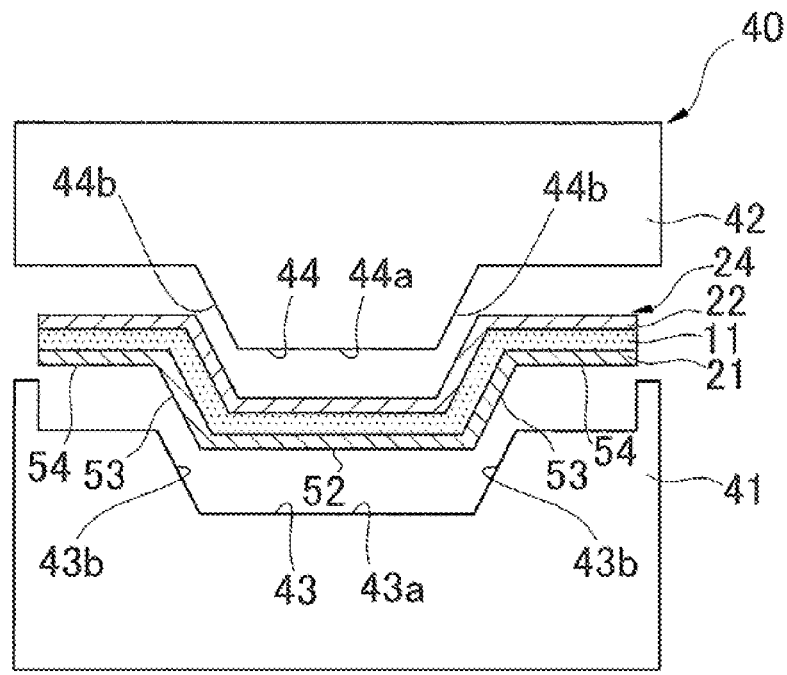
FIG. 11 is a process diagram continuing from the previous diagram.

In this step, as shown in FIGS. 9 to 11, the intermediate laminate 24 is molded by so-called press molding. A first molding step will be described in detail below.

As shown in FIG. 9, a mold 40 is used in this step. The mold 40 has a first mold 41 and a second mold 42. In the following description, there are cases where on the premise that the first mold 41 is above the second mold 42, the positional relationship thereof is described.

The first mold 41 has a first forming part 43. The first forming part 43 has a bottom face 43a having a shape conforming to the external surface 21b (see FIG. 1) of the first resin layer 21, and a side face 43b inclined relative to the bottom face 43a.

The second mold 42 has a second forming part 44. The second forming part 44 has a top face 44a having a shape conforming to the external surface 22b (see FIG. 1) of the second resin layer 22, and a side face 44b inclined relative to the top face 44a.

The first forming part 43 and the second forming part 44 form a space having a shape conforming to the first resin layer 21, the adhesion layer 23, and the second resin layer 22 (see FIG. 1) between the first mold 41 and the second mold 42.

The intermediate laminate 24 shown in FIG. 9 is flat.

As shown in FIG. 10, the first mold 41 and the second mold 42 are closed in the state where the intermediate laminate 24 is sandwiched therebetween. The intermediate laminate 24 is bent and deformed by being pressed by the top face 44a and the side face 44b of the second forming part 44. A part of the external surface 21b of the first resin layer 21 is abutted against the bottom face 43a of the first forming part 43 without a gap. A side face 21e (part of the external surface 21b) of the first resin layer 21 is abutted against the side face 43b of the first forming part 43 without a gap. A part of the external surface 22b of the second resin layer 22 is abutted against the top face 44a of the second forming part 44 without a gap. A side face 22e (part of the external surface 22b) of the second resin layer 22 is abutted against the side face 44b of the second forming part 44 without a gap.

In this manner, the intermediate laminate 24 is molded by press molding. The molded intermediate laminate 24 has a shape provided with a bottom part 52, inclined parts 53 extending from both ends of the bottom part 52, and flange parts 54 extending outward from external ends of the inclined parts 53.

When the intermediate laminate 24 is heated during press molding with the mold 40, at least part of the adhesive resin layer 11 may be cured. For example, the temperature of the adhesive resin layer 11 may be, for example, 100 to 250° C. For example, by heating for a time of 30 seconds to 10 minutes, at least part of the adhesive resin layer 11 is thermally cured to become the adhesion layer 23. In that case, the reaction (polymerization, crosslinking or the like) between the acrylic-based polymer and the crosslinking agent proceeds, the adhesive resin layer 11 is cured, and at the same time, an adhesive force between the resin layers 21 and 22 is increased.

As shown in FIG. 11, the molded intermediate laminate 24 is taken out from the mold 40.

(Second Molding Step: Formation of Third Resin Layer)

Figure 12:
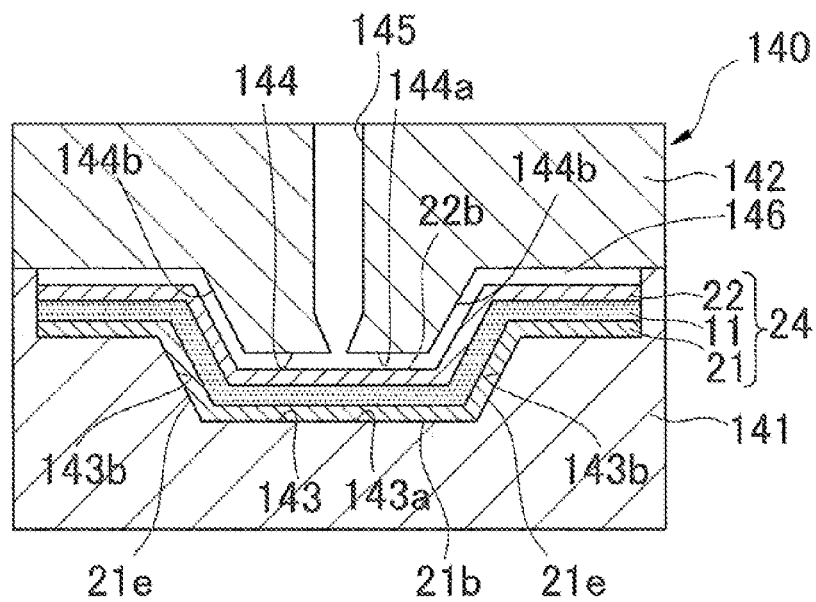
FIG. 12 is a process diagram continuing from the previous diagram.
Figure 13:
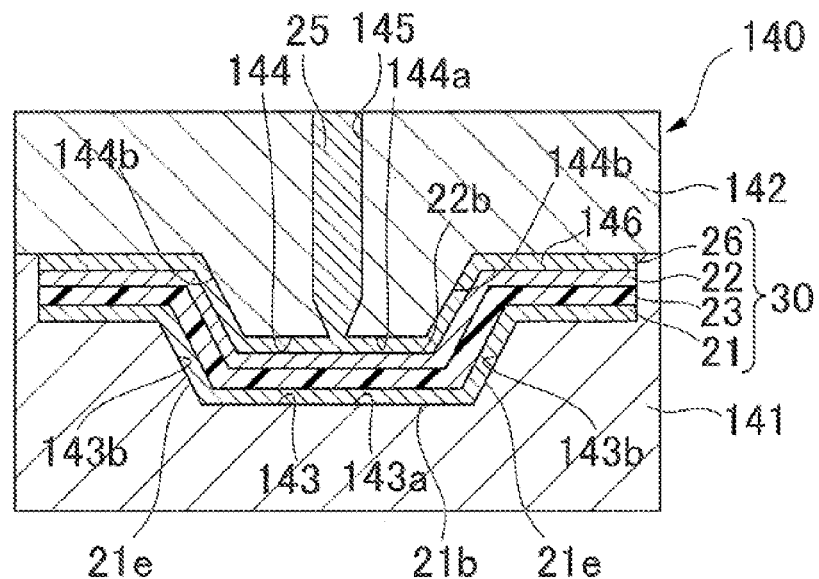
FIG. 13 is a process diagram continuing from the previous diagram.
Figure 14:
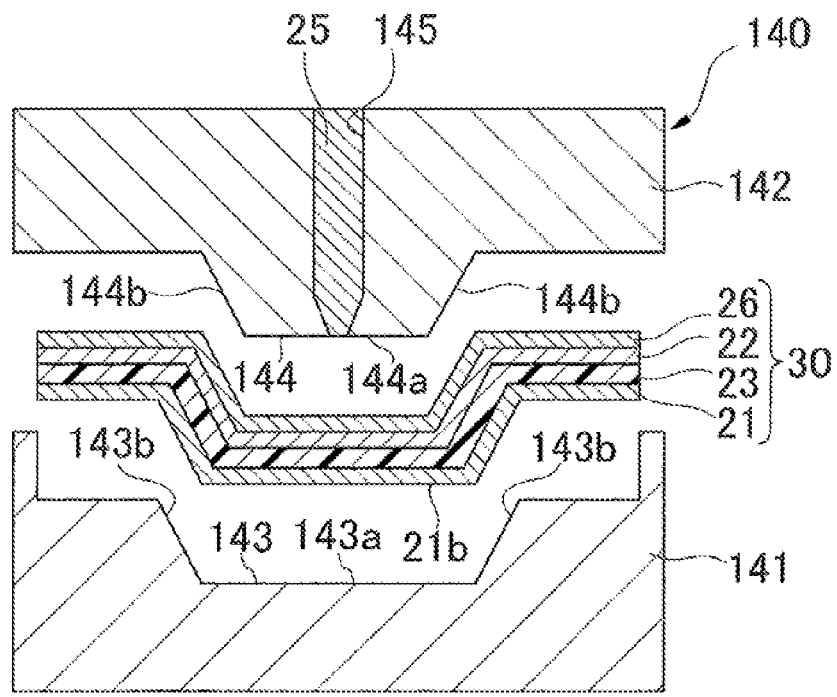
FIG. 14 is a process diagram continuing from the previous diagram.

In this step, as shown in FIGS. 12 to 14, the third resin layer 26 (resin member) is formed on the external surface 22b of the second resin layer 22 by so-called insert molding. A second molding step will be described in detail below.

As shown in FIG. 12, a mold 140 (mold for injection molding) is used in this step. The mold 140 has a first mold 141 and a second mold 142. In the following description, there are cases where on the premise that the first mold 141 is above the second mold 142, the positional relationship thereof is described.

The first mold 141 has a first forming part 143. The first forming part 143 has a bottom face 143a having a shape conforming to the external surface 21b of the first resin layer 21, and a side face 143b inclined relative to the bottom face 143a.

The second mold 142 has a second forming part 144. The second forming part 144 has a top face 144a having a shape conforming to the external surface 26b (see FIG. 1) of the third resin layer 26, and a side face 144b inclined relative to the top face 144a.

The first forming part 143 and the second forming part 144 form a space having a shape conforming to the laminated structure 30 (see FIG. 1) between the first mold 141 and the second mold 142.

The second mold 142 has a flow channel 145 through which a melted raw material resin 25 is supplied to the second forming part 144.

The intermediate laminate 24 is arranged between the first mold 141 and the second mold 142, and the first mold 141 and the second mold 142 are closed. A part of the external surface 21b of the first resin layer 21 is abutted against the bottom face 143a of the first forming part 143 without a gap. The side face 21e (part of the external surface 21b) of the first resin layer 21 is abutted against the side face 143b of the first forming part 143 without a gap.

A space 146 having a shape conforming to the third resin layer 26 (see FIG. 1) is secured between the internal surface of the second forming part 144 of the second mold 142 and the intermediate laminate 24.

As shown in FIG. 13, a melted raw material resin 25 is supplied (injected) into the space 146 through the flow channel 145. The space 146 is filled with the raw material resin 25. In this manner, the third resin layer 26 is formed by injection molding. The third resin layer 26 is formed in contact with the external surface 22b of the second resin layer 22.

The temperature (melting temperature) of the raw material resin 25 is, for example, 100 to 250° C. It is preferable that the melting temperature is higher than the 1-minute half-life temperature of the thermal polymerization initiator. This can enhance the reactivity of the thermal polymerization initiator.

By conduction of heat of the raw material resin 25 to the adhesive resin layer 11 via the second resin layer 22, the temperature of the adhesive resin layer 11 rises to, for example, 100 to 250° C. For example, by heating for a time of 30 seconds to 10 minutes, at least part of the adhesive resin layer 11 is thermally cured to become the adhesion layer 23. In that case, the reaction (polymerization, crosslinking or the like) between the acrylic-based polymer and the crosslinking agent proceeds, the adhesive resin layer 11 is cured, and at the same time, an adhesive force between the resin layers 21 and 22 is increased. The adhesion layer 23 has an adhesion strength to the first resin layer 21 or the second resin layer 22 of, for example, 20 N/25 mm or more. This provides the laminated structure 30 shown in FIG. 1.

In the second molding step, it is not necessary that the adhesive resin layer 11 is completely cured, and curing just needs to proceed in at least part of the adhesive resin layer 11.

As shown in FIG. 14, the laminated structure 30 is taken out from the mold 140. Since the hardness of the adhesion layer 23 is enhanced by heating, even when the laminated structure 30 is taken out while the mold 140 is at a high temperature, deformation of the laminated structure 30 is hardly caused. For that reason, it is not necessary to excessively cool the mold 140, and this is advantageous in respect of working efficiency.

When the curing of the adhesive resin layer 11 is insufficient, the hardness of the adhesive resin layer 11 can be enhanced by a step of further performing heating.

In the above-mentioned production method, the adhesive resin layer 11 containing at least the (A) acrylic-based polymer, the (B) crosslinking agent, and the (C) thermal polymerization initiator is used, and the third resin layer 26 is formed on the surface of the second resin layer 22 by injection molding. For that reason, the adhesive resin layer 11 can be cured by the heat of the raw material resin 25, to obtain the laminated structure 30 having a stable shape. Hence, the working efficiency in production of the laminated structure 30 can be enhanced.

Since the above-mentioned adhesive resin layer 11 is used in the above-mentioned production method, the adhesion strength between the first resin layer 21 and the second resin layer 22 can be enhanced.

Furthermore, since the adhesive resin layer 11 is formed on the first resin layer 21 using the adhesive resin film 10 in the above-mentioned production method, the step can be simplified and the working efficiency can be enhanced, as compared with a production method of forming an adhesive resin layer by application.

Laminated Structure Second Embodiment

Figure 15:
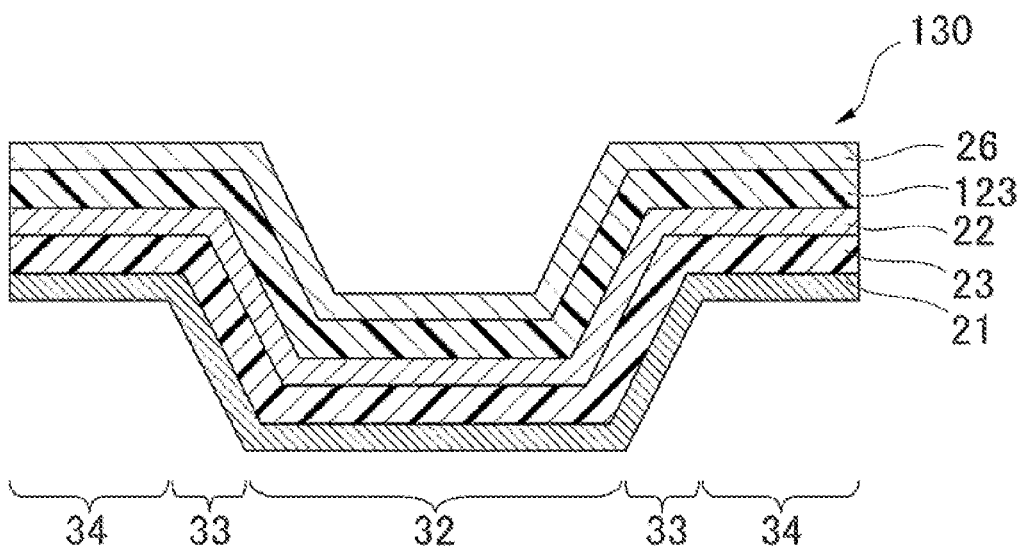
FIG. 15 is a schematic view showing one example of a laminated structure prepared by a production method of a second embodiment.

FIG. 15 is a schematic view showing a laminated structure 130 which is one example of a laminated structure prepared by a production method of a second embodiment. Note that the same symbols are given to the constituent features common to those of the first embodiment, and the description thereof will be omitted.

As shown in FIG. 15, the laminated structure 130 is different from the laminated structure 30 of the first embodiment (see FIG. 1) in that a second adhesion layer 123 is provided between a second resin layer 22 and a third resin layer 26. The adhesion layer 23 of the laminated structure 130 is also referred to as a first adhesion layer 23.

Method of Producing Laminated Structure Second Embodiment

Figure 16:
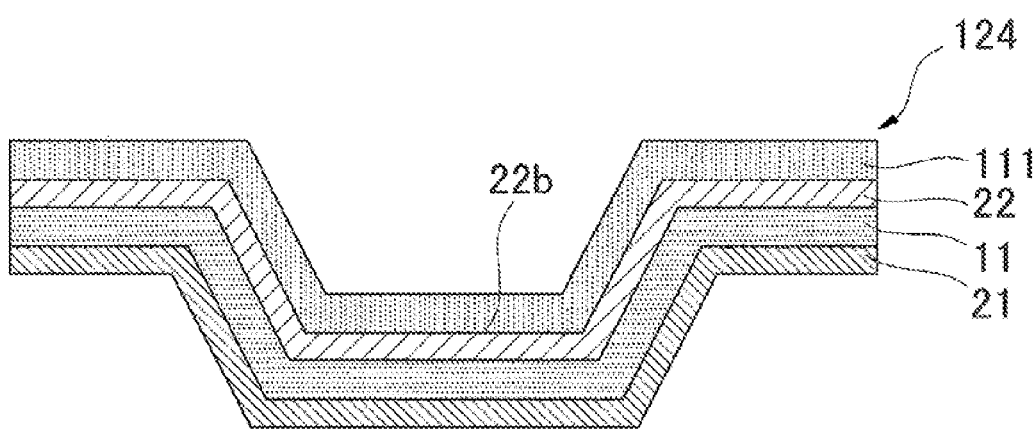
FIG. 16 is a process diagram showing the production method of the second embodiment.
Figure 17:
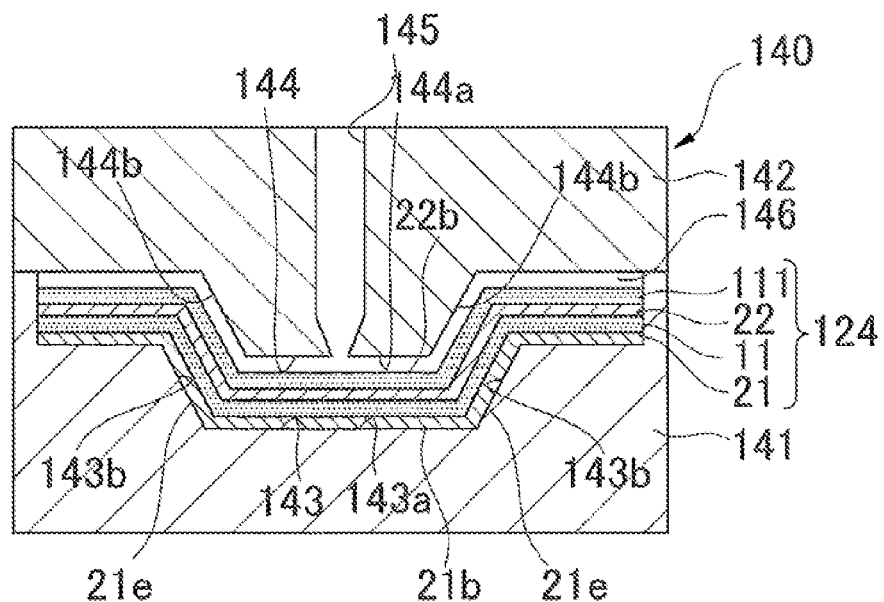
FIG. 17 is a process diagram continuing from the previous diagram.
Figure 18:
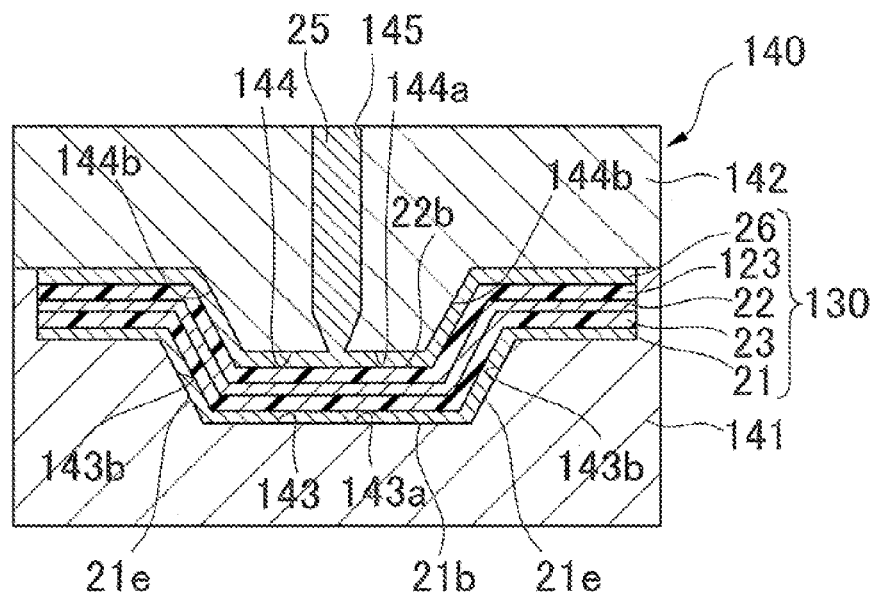
FIG. 18 is a process diagram continuing from the previous diagram.

The method of producing the laminated structure 130 will be described below.
(Preliminary Step: Preparation of Adhesive Resin Film)
An adhesive resin film 10 shown in FIG. 3 is prepared in a manner similar to the first embodiment.
(First Lamination Step: Preparation of Intermediate Laminate)
As shown in FIGS. 4 to 8, an intermediate laminate 24 is prepared in a manner similar to the first embodiment. In this intermediate laminate 24, an adhesive resin layer 11 is also referred to as a first adhesive resin layer 11.
(First Molding Step: Molding of Intermediate Laminate)
As shown in FIGS. 9 to 11, the intermediate laminate 24 is molded by press molding in a manner similar to the first embodiment.
(Second Lamination Step: Formation of Second Adhesive Resin Layer)
As shown in FIG. 16, in accordance with the first lamination step, a second adhesive resin layer 111 is formed on an external surface 22b of a second resin layer 22, so that an intermediate laminate 124 is obtained. The second adhesive resin layer 111 may have a configuration similar to that of the adhesive resin layer 11 in the first embodiment.
(Second Molding Step: Formation of Third Resin Layer)
As shown in FIGS. 17 and 18, the third resin layer 26 (resin member) is formed on the external surface of the second adhesive resin layer 111 by so-called insert molding in a manner similar to the first embodiment.

By conduction of heat of a raw material resin 25 to the second adhesive resin layer 111, and further, conduction of heat to the first adhesive resin layer 11 via the second resin layer 22, the temperature of the first adhesive resin layer 11 and that of the second adhesive resin layer 111 rise to, for example, 100 to 250° C. For example, by heating for a time of 30 seconds to 10 minutes, at least part of the first adhesive resin layer 11 is thermally cured to become the first adhesion layer 23. Additionally, by the above-mentioned heating, at least part of the second adhesive resin layer 111 is thermally cured to become the second adhesion layer 123. In that case, the reaction (polymerization, crosslinking or the like) between the acrylic-based polymer and the crosslinking agent proceeds, the first adhesive resin layer 11 is cured, and at the same time, an adhesive force between the resin layers 21 and 22 is increased. Additionally, the second adhesive resin layer 111 is cured, and at the same time, an adhesive force between the resin layers 22 and 26 is increased.

The first adhesion layer 23 has an adhesion strength to the first resin layer 21 or the second resin layer 22 of, for example, 20 N/25 mm or more. The second adhesion layer 123 has an adhesion strength to the second resin layer 22 or the third resin layer 26 of, for example, 20 N/25 mm or more. This provides the laminated structure 130 shown in FIG. 15.

In the second molding step, it is not necessary that the first adhesive resin layer 11 and the second adhesive resin layer 111 are completely cured, and curing just needs to proceed in at least part of the first adhesive resin layer 11 and in at least part of the second adhesive resin layer 111.

Figure 19:
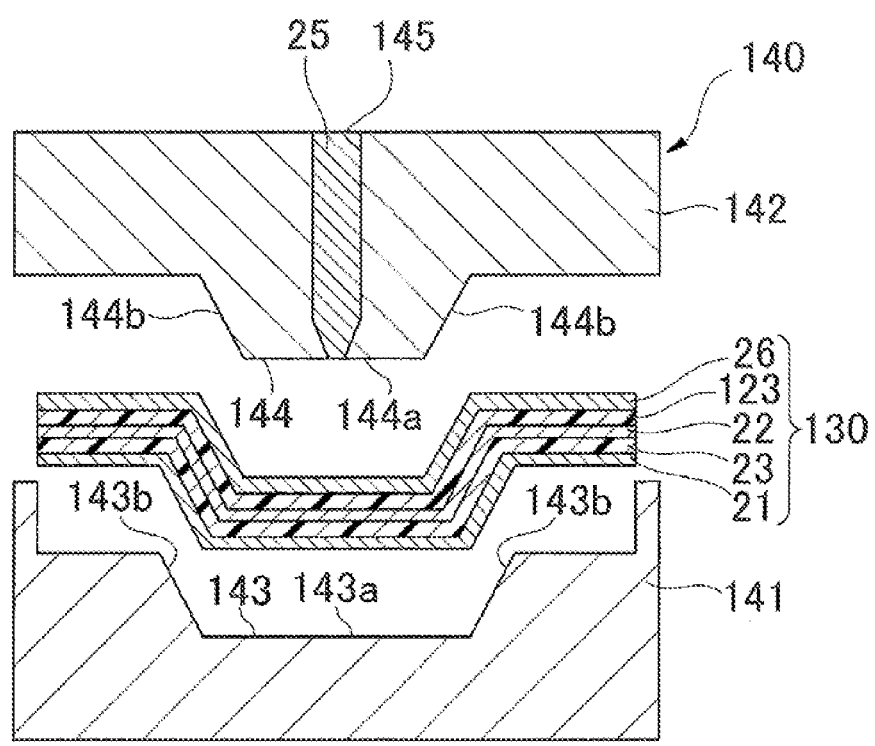
FIG. 19 is a process diagram continuing from the previous diagram.

As shown in FIG. 19, the laminated structure 130 is taken out from the mold. Since the hardness of the adhesion layers 23 and 123 is enhanced by heating, even when the laminated structure 130 is taken out while the mold is at a high temperature, deformation of the laminated structure 130 is hardly caused. For that reason, it is not necessary to excessively cool the mold, and this is advantageous in respect of working efficiency.

When the curing of the first adhesive resin layer 11 and the second adhesive resin layer 111 is insufficient, the hardness of the first adhesive resin layer 11 and the second adhesive resin layer 111 can be enhanced by a step of further performing heating.

In the above-mentioned production method, the first adhesive resin layer 11 and the second adhesive resin layer 111 containing at least the (A) acrylic-based polymer, the (B) crosslinking agent, and the (C) thermal polymerization initiator are used, and the third resin layer 26 is formed on the surface of the second adhesive resin layer 111 by injection molding. For that reason, the first adhesive resin layer 11 and the second adhesive resin layer 111 can be cured by the heat of the raw material resin 25, to obtain the laminated structure 130 having a stable shape. Hence, the working efficiency in production of the laminated structure 130 can be enhanced.

In the above-mentioned production method, the above-mentioned first adhesive resin layer 11 and second adhesive resin layer 111 are used, so that the adhesion strength between the first resin layer 21 and the second resin layer 22, and the adhesion strength between the second resin layer 22 and the third resin layer 26 can be enhanced.

Furthermore, in the above-mentioned production method, the first adhesive resin layer 11 and the second adhesive resin layer 111 are formed using the adhesive resin film 10, so that the step can be simplified and the working efficiency can be enhanced, as compared with a production method of forming an adhesive resin layer by application.

The present invention has been described above based on preferred embodiments, but the present invention is not limited to the above-mentioned embodiments, and various modifications can be made in a range not departing from the gist of the present invention.

The laminated structure may have an adhesion layer between each of four or more resin layers. It is preferable that one or more (preferably all) of two or more adhesion layers included in the laminated structure are adhesion layers shown in the present embodiment.

In the above-mentioned preliminary step, it is preferable that when the adhesive resin layer 11 shown in FIG. 3 is produced, a step of removing a solvent from an adhesive raw material composition containing the solvent by heating is provided.

In the second molding step, it is necessary to heat the mold at a temperature higher than a desired heating temperature in order to apply heat by which the heating temperature of the adhesive resin layer becomes 100 to 250° C. The temperature of the mold is preferably, for example, 100 to 300° C.

In the second molding step, from the viewpoint of productivity, it is preferable that the reaction of the adhesion layer has proceeded to some extent, or has been completed, in a short time, for example, within 5 minutes.

The adhesive resin composition may be translucent or opaque but preferably has transparency.

It is preferable that the internal surface of the first resin layer has a one-directionally bent shape. The one-directionally bent shape is a shape such that in a straight line along at least one in-plane direction, at least one thickness-directional cross section has a straight line shape at any position in the lengthwise direction. For example, in the internal surface 21a of the first resin layer 21 shown in FIG. 1, a standard straight line from one end 21c to the other end 21d (not shown) along the lengthwise direction (X direction shown in FIG. 1) of the first resin layer 21 is supposed. A thickness-directional cross section along the width direction (Y direction shown in FIG. 1) of the internal surface 21a has a straight line shape at any position in the lengthwise direction of the standard straight line.

In addition, the standard straight line may be a straight line when the internal surface 21a is flattened. The Y direction is a direction orthogonal to the X direction in a plane of the internal surface 21a.

The shape of the internal surface of the first resin layer is not limited to the one-directionally bent shape, but may be a multi-directionally bent shape (three-dimensional shape). The multi-directionally bent shape is a shape such that, for example, in the internal surface 21a shown in FIG. 1, a thickness-directional cross section does not have a straight line shape at any one position in the lengthwise direction of the above-mentioned standard straight line (not shown). Examples of the multi-directionally bent shape (three-dimensional shape) include a curved concave shape along a spherical surface, and the like.

EXAMPLES

The present invention will be specifically described below by way of examples.

Example 1

Using SK Dyne (registered trademark) 2094 (Soken Chemical & Engineering Co., Ltd.) as a polymer solution containing an acrylic-based polymer, and E-AX (Soken Chemical & Engineering Co., Ltd.) as a crosslinking agent, the crosslinking agent was blended at a ratio of 0.2 parts by weight based on 100 parts by weight of the acrylic-based polymer. To the resulting mixture were added 0.08 parts by weight of t-butyl peroxy-2-ethylhexanoate (manufactured by NOF CORPORATION; product name: PERBUTYL (registered trademark) O) as a thermal polymerization initiator, and 40 parts by weight of 4-hydroxybutyl acrylate (OSAKA ORGANIC CHEMISTRY INDUSTRY LTD.; 4HBA) that is an acrylic-based monomer, to prepare an adhesive raw material composition.

The adhesive raw material composition contains ethyl acetate (boiling point 77° C.) as a solvent and has improvement in property such as viscosity as a paint for coating.

After this adhesive raw material composition was applied on an upper surface of a separator (manufactured by FUJIMORI KOGYO CO., LTD.; product name: 125E-0010DG2.5AS, thickness 125 μm) using an applicator so that a thickness of the adhesive resin layer (pressure-sensitive adhesive layer) after drying became 50 μm, the solvent was dried under conditions of 90° C. and 2 minutes in a drying step, to prepare a laminate in which the adhesive resin layer was laminated.

Then, a separator (manufactured by FUJIMORI KOGYO CO., LTD.; product name: 38E-0010BDAS, thickness 38 μm) was stuck to an upper surface of the adhesive resin layer of the resulting laminate, to prepare an adhesive resin film.

Thereafter, the reaction between the acrylic-based polymer and the (epoxy-based) crosslinking agent was completed by performing aging for one week, to obtain an adhesive resin layer containing four kinds of components of a crosslinked acrylic-based polymer, the crosslinking agent, the thermal polymerization initiator, and the acrylic-based monomer.

The constitution of the adhesive raw material composition and the thickness of the adhesive resin layer are shown in Table 1.

In addition, in Table 1, when a product is commercially available as a solution, a numerical value of parts by weight represents parts by weight of each component constituting the adhesive resin layer among components of the solution.

Examples 2 to 4

The constitution of the adhesive raw material compositions and the thickness of the adhesive resin layers are shown in Table 1.

In Example 2, an isocyanate-based crosslinking agent (TD-75, CORONATE HX) reacts not only with a functional group of the acrylic-based polymer, but also with part of the acrylic-based monomer containing a hydroxyl group (4HBA), to form a crosslinked acrylic-based polymer. Also, in that case, the adhesive resin layer contains four kinds of components of the acrylic-based polymer, the crosslinking agent, the thermal polymerization initiator, and the acrylic-based monomer, as in Example 1.

Comparative Example 1

An adhesive resin film was prepared in the same manner as in Example 1 except that the adhesive resin layer did not contain the thermal polymerization initiator and the acrylic-based monomer.

"SK Dyne 2094" represents a product name of an acrylic-based polymer, SK Dyne (registered trademark) 2094 (Soken Chemical & Engineering Co., Ltd., acid value: 33, number average molecular weight 70,000, solid matter concentration 25%). "SK Dyne 2147" represents a product name of an acrylic-based polymer, SK Dyne (registered trademark) 2147 (Soken Chemical & Engineering Co., Ltd., acid value: 33). "E-AX" represents a product name of an epoxy-based curing agent (Soken Chemical & Engineering Co., Ltd.). "TD-75" represents a product name of an isocyanate-based curing agent (Soken Chemical & Engineering Co., Ltd.). "UV-3310B" represents a product name of urethane acrylate (The Nippon Synthetic Chemical Industry Co., Ltd.). "PERBUTYL (registered trademark) O" is a thermal polymerization initiator containing t-butyl peroxy-2-ethylhexanoate as an active component (NOF CORPORATION, 1-minute half-life temperature: 134.0° C.).

temperature) of the raw material resin 25 was set to 200° C. The heating time (time during which the first mold 141 and the second mold 142 were closed) was set to one minute. As shown in FIG. 14, the laminated structure 30 was taken out from the mold 40.

Regarding the laminated structure 30, the close attachment state of the adhesion layer 23 to the resin layers 21 and 22 (close attachment) was confirmed.

○: There is no floating or peeling

Δ: Floating and peeling are partially observed

X: Floating and peeling are observed overall

TABLE 1

| | Constitution of Adhesive Raw Material Composition | | | | | |
|---|---|---|---|---|---|---|
| | Acrylic-based Polymer/parts by weight | Crosslinking Agent/equivalents | Thermal Polymerization Initiator/parts by weight | Acrylic-based Monomer/parts by weight | Adhesive Resin Layer Thickness/μm | Close Attachment |
| Example 1 | SK Dyne 2094/100 | E-AX/0.2 | PERBUTYL O/0.08 | 4HBA/40 | 50 | ○ |
| Example 2 | SK Dyne 2147/100 | TD-75/0.16 | PERBUTYL O/0.08 | 4HBA/40 | 50 | ○ |
| Example 3 | SK Dyne 2094/100 | E-AX/0.2 | PERBUTYL O/0.08 | 4HBA/5 | 50 | ○ |
| Example 4 | SK Dyne 2094/100 | E-AX/0.56 | PERBUTYL O/0.08 | UV-3310B/5 | 50 | ○ |
| Comparative Example 1 | SK Dyne 2094/100 | E-AX/0.2 | — | — | 50 | x |

(Test Results)

Next, an evaluation method and the results thereof will be described.

(Lamination Step: Preparation of Intermediate Laminate)

The first resin layer 21 shown in FIG. 4 is a polyethylene terephthalate (PET) sheet having a thickness of 100 μm, which has been cut into 15 cm×15 cm.

As shown in FIGS. 4 and 5, the first separator 12 was peeled from the adhesive resin film 10 to expose the pressure-sensitive adhesive surface 11a of the adhesive resin layer 11. As shown in FIG. 6, the adhesive resin layer 11 was stuck to the internal surface 21a of the first resin layer 21. By rolling the pressing roller 31 in the lengthwise direction (arrow direction) along the external surface of the second separator 13, the adhesive resin layer 11 was pressed toward the internal surface 21a of the first resin layer 21 via the second separator 13. As shown in FIG. 7, the second separator 13 was peeled from the adhesive resin layer 11, and as shown in FIG. 8, the second resin layer 22 (PET) was stuck to the second face 11b of the adhesive resin layer 11, so that the intermediate laminate 24 was obtained.

(First Molding Step: Molding of Intermediate Laminate)

As shown in FIGS. 9 and 10, the first mold 41 and the second mold 42 were closed in the state where the intermediate laminate 24 was sandwiched therebetween, so that the intermediate laminate 24 was molded by press molding. As shown in FIG. 11, the molded intermediate laminate 24 was taken out from the mold 40.

(Second Molding Step: Formation of Third Resin Layer)

As shown in FIG. 12, the intermediate laminate 24 was arranged between the first mold 141 and the second mold 142, and the first mold 141 and the second mold 142 were closed.

As shown in FIG. 13, the melted raw material resin 25 (PET) was supplied (injected) into the space 146 through the flow channel 145 and the space 146 was filled with the melted raw material resin 25, so that the third resin layer 26 (thickness 100 μm) was formed. The temperature (melting (Evaluation Results)

All of Examples 1 to 4 showed sufficient adhesion strength (close attachment). In contrast, Comparative Example 1 showed low adhesion strength (close attachment).

A laminated structure was prepared in the same manner as in Example 1 except that "PERCUMYL (registered trademark) P" having a high 1-minute half-life temperature (about 232° C.) was used in place of "PERBUTYL (registered trademark) O" (1-minute half-life temperature: 134.0° C.), as the thermal polymerization initiator, and as a result, the adhesion strength was slightly low as compared with those in Examples 1 to 4.

From the foregoing results, it was found that when the adhesive resin layer contains the (A) acrylic-based polymer, the (B) crosslinking agent, and the (C) thermal polymerization initiator, a laminated structure excellent in respect of adhesion strength is obtained.

DESCRIPTION OF THE REFERENCE NUMERALS

10: Adhesive resin film
11: Adhesive resin layer (First adhesive resin layer)
11b: Second face (Surface)
12, 13: Separator
21: First resin layer
21a: Internal surface (Forming surface)
21b: External surface
22: Second resin layer
22a: Internal surface
23: Adhesion layer (First adhesion layer)
25: Raw material resin
26: Third resin layer (Resin member)
30, 130: Laminated structure
31: Pressing roller
111: Second adhesive resin layer
123: Second adhesion layer

What is claimed is:

1. A method of producing a laminated structure, the method comprising:

a lamination step of preparing an intermediate laminate in which a first resin layer and a second resin layer are laminated with an adhesive resin layer interposed between the first resin layer and the second resin layer;

a first molding step of molding said intermediate laminate by press molding; and a second molding step of forming a resin member on a surface of said molded intermediate laminate by injection molding using a raw material resin to obtain the laminated structure, wherein an adhesive resin composition constituting said adhesive resin layer contains at least (A) an acrylic-based polymer, (B) a crosslinking agent, and (C) a thermal polymerization initiator, during the preparation of said intermediate laminate in said lamination step, a first separator is peeled from a structure having said first separator, a second separator, and said adhesive resin layer laminated between said first separator and said second separator; an exposed surface of said adhesive resin layer is stuck to one of said first resin layer and said second resin layer; then said adhesive resin layer is pressed via said second separator using a pressing roller before said second separator is peeled; said second separator is then peeled; and an exposed surface of said adhesive resin layer is stuck to another of said first resin layer and said second resin layer, in said first molding step, a temperature of said adhesive resin layer is 100 to 250° C., and by heating for 30 seconds to 10 minutes, a part of said adhesive resin layer is thermally cured to be an adhesion layer, in said second molding step, a melting temperature of said raw material resin is 100 to 250° C., said (C) thermal polymerization initiator has a 1-minute half-life temperature lower than the melting temperature of said raw material resin by 20° C. or higher, a temperature of a mold for injection molding is 100 to 300° C., said adhesive resin layer has an adhesion strength to said first resin layer or said second resin layer of said intermediate laminate of less than 20 N/25 mm, said adhesion layer has an adhesion strength to said first resin layer or said second resin layer of said laminated structure of 20 N/25 mm or more, and said first resin layer, said second resin layer, and said resin member include polyester as a raw material resin.

2. The method of producing the laminated structure according to claim 1, wherein at least an internal surface is decorated in at least either one of said first resin layer and said second resin layer.

3. The method of producing the laminated structure according to claim 1, wherein said adhesive resin composition further comprises an acrylic-based monomer or an acrylic-based oligomer.

4. The method of producing the laminated structure according to claim 1, wherein said adhesive resin composition further comprises an acrylic-based monomer, and said acrylic-based monomer is a monomer containing a hydroxyl group.

5. The method of producing the laminated structure according to claim 1, wherein said adhesive resin composition further comprises an acrylic-based oligomer and contains curable urethane acrylate as said acrylic-based oligomer.

6. The method of producing the laminated structure according to claim 1, wherein said adhesion layer has a haze of 2.0% or less.

7. The method of producing the laminated structure according to claim 1, wherein said adhesion layer has a haze of 1.0% or less and has a transmittance of visible light of 85% or more.

8. The method of producing the laminated structure according to claim 1, wherein said adhesion layer has a thickness of 20 μm or more and 200 μm or less.

* * * * *